Jan. 20, 1925.
M. W. ARMSTRONG
BRAKE RIGGING FOR TRAILERS
Filed Sept. 27, 1923
1,523,853
2 Sheets-Sheet 2
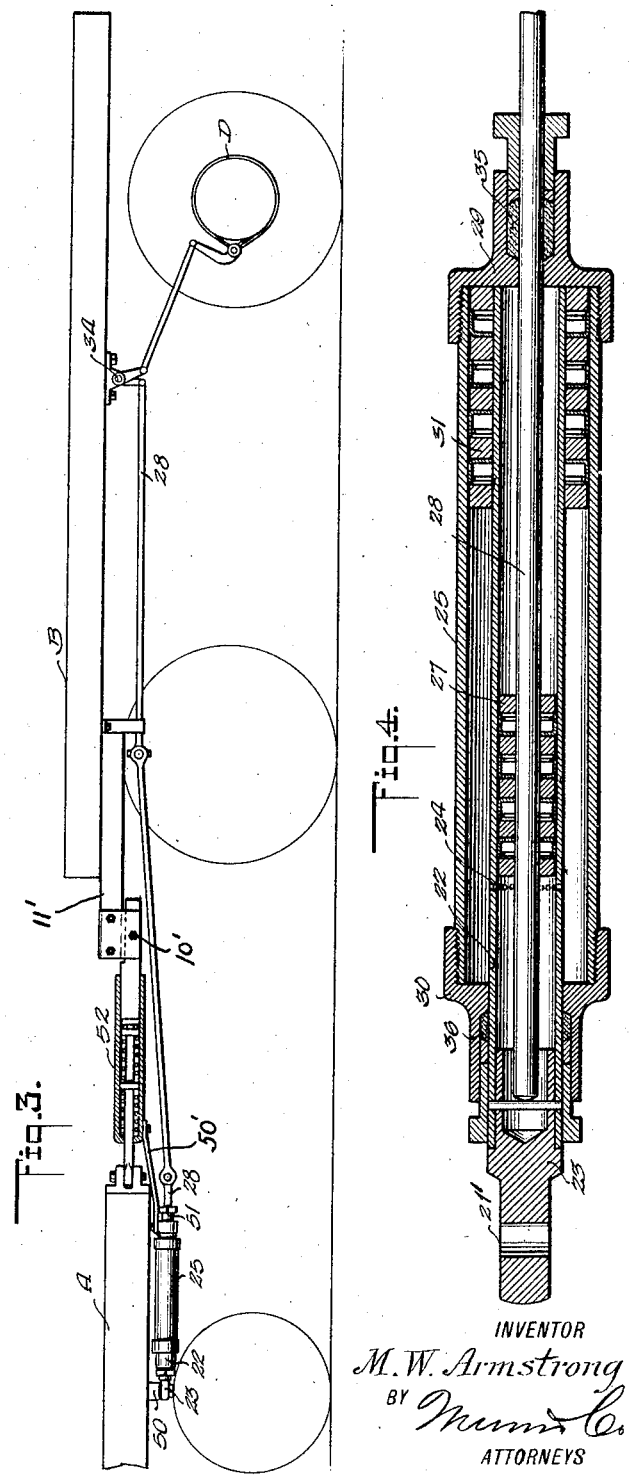
INVENTOR
M. W. Armstrong
BY
ATTORNEYS Patented Jan. 20, 1925.

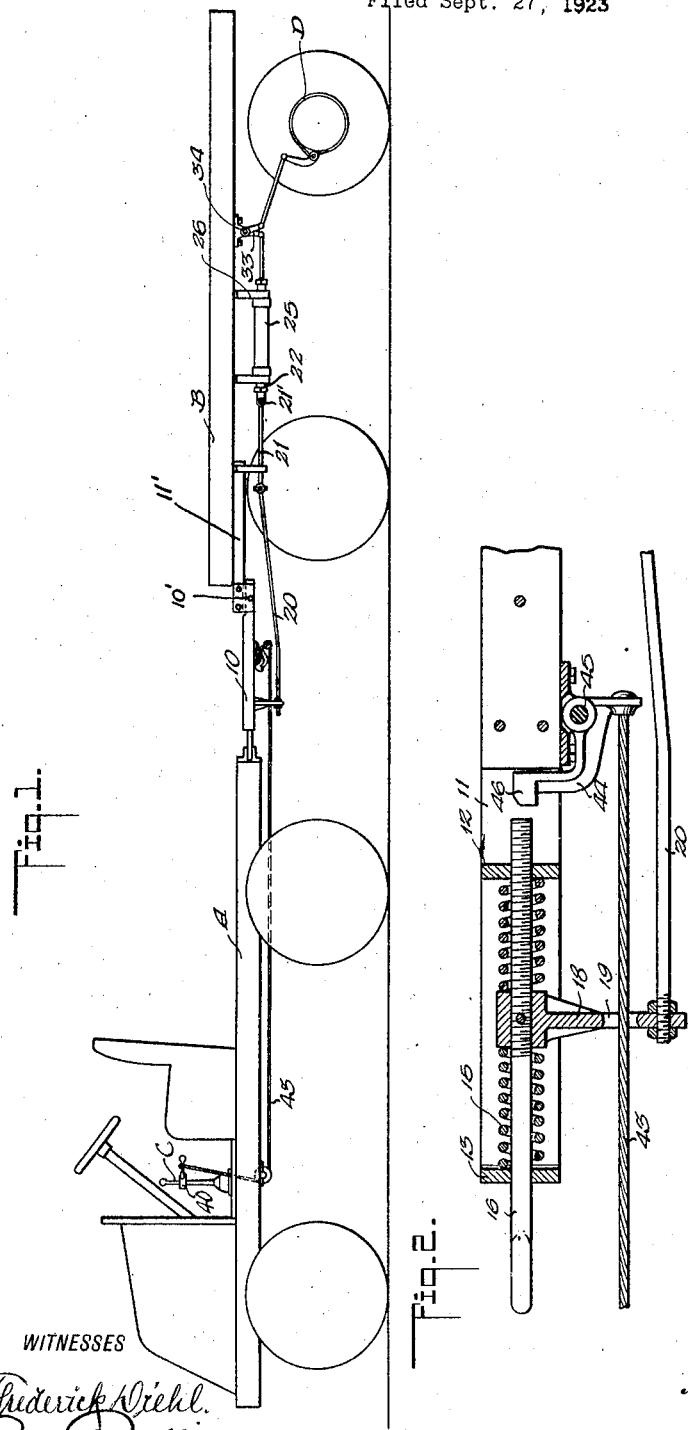

1,523,853

UNITED STATES PATENT OFFICE.

MILTON WILLIAMS ARMSTRONG, OF FULLERTON, CALIFORNIA.

BRAKE RIGGING FOR TRAILERS.

Application filed September 27, 1923. Serial No. 665,182.

*To all whom it may concern:*

Be it known that I, MILTON W. ARMSTRONG, a citizen of the United States, and a resident of Fullerton, in the county of Orange and State of California, have invented a new and Improved Brake Rigging for Trailers, of which the following is a full, clear, and exact description.

The present invention relates to new and useful improvements in vehicle brakes, and it pertains more particularly to brakes for trailers such as drawn by motor vehicles.

Reference is had to the accompanying drawings, in which—

Figure 1 is a view in side elevation of a motor truck and trailer showing a device constructed in accordance with the present invention in place thereon;

Fig. 2 is a detail longitudinal sectional view of the draw bar used in connection with the present invention;

Fig. 3 is a view in side elevation of a trailer showing a portion of the rear of a motor truck with a device constructed in accordance with the present invention attached to the truck;

Fig. 4 is a longitudinal sectional view of a device constructed in accordance with the present invention.

Referring more particularly to the drawings, the reference character A designates a draft vehicle, and B designates a trailer. The reference character C designates a gear shift lever of the draft vehicle, and D designates the brakes of the trailer.

In carrying out the present invention the draft vehicle A and the trailer B are connected together by means of a draw bar 10. This draw bar 10 is pivotally connected as at 10′ to a tongue member 11′ carried by the trailer B. As more clearly shown in Figs. 2 and 3, this draw bar comprises a yoke 11 having a partition 12 extending transversely thereof. Mounted between the partition 12 and the closed end 13 of the yoke 11, are opposed coil springs 14 and 15, and passing through said coil springs 14 and 15 is an eyebolt 16, which eyebolt is connected to the draft vehicle A. The eyebolt 16 is screw-threaded as at 17, and carried by said screw-threaded portion is a depending arm 18 having an opening 19 therethrough, the purpose of which will be hereinafter described.

Extending rearwardly from the arm 18 is a rigid rod 20, which is pivotally connected to a rod 21, which in turn is pivotally connected as at 21′ to a cylinder 22 by means of a plug member 23, as more clearly shown in Fig. 4. This cylinder 22 has a plurality of perforations 24 therein, and the purpose of these perforations will be hereinafter described. The cylinder 22 is mounted for longitudinal movement within a cylinder 25 and the cylinder 25 is secured by straps, or the like, 26, to the trailer B.

Referring to Fig. 4 it will be seen that the cylinder 22 has mounted therein a piston 27, secured to a piston rod 28, which extends longitudinally of the cylinder 22 and is slidably mounted in an end member 29 which serves to close one end of the cylinder 25, the opposite end of the cylinder 25 being closed by means of a cap, or the like, 30. The cylinder 22 has secured thereto a piston head 31 which forms a piston for the cylinder 25. The rod 28 is connected to an arm 33, which operates the jack shaft 34 of the brake mechanism D of the trailer, as more clearly shown in Fig. 1, and this rod extends through a stuffing box 35 in the cap 29. A stuffing box is provided at the opposite end of the cylinder, and the cylinder 22 works in said stuffing box in the cap 30.

The device operates in the following manner:

Referring to Fig. 4 in which the parts are shown in the position in which the brakes on the trailer are applied, it is obvious that this is the position when the vehicles are standing. Immediately the draft vehicle starts forwardly the cylinder 22 is moved longitudinally of the cylinder 25 and the piston head 31 forces air or other fluid through the perforations 24 into the interior of the cylinder 22, it being understood that both of the cylinders are filled with fluid in the form of air, water, oil, or other suitable medium. Owing to the fact that the rod 28 is immovable as the cylinder 22 moves with respect to the rod 28, the fluid behind or to the right of the piston head 27 will be forced outwardly through the open end of the cylinder 22 into the space or chamber caused by the movement of the piston head 31 to the left. Inasmuch as this space is larger and has no restrictions such, for example, as the perforations 24, the rod 28 will move to the right at a greater speed than the cylinder 22 will move to the left, and thus the brakes of the trailer will be released.

As the brakes of the trailer are released and the maximum draft on the draw bar is had, the trailer will start to move and the brakes will be maintained in released position.

With the parts in the release position, the cylinder 25 behind or to the right of the piston head 31 has a greater capacity than the cylinder 22 in front of or to the left of the piston 27, and this condition permits of the cylinder 22 having a slight movement in either direction without effect on the rod 28 for the purpose of taking care of slight variation in draft and road imperfections and without application of the brakes, and thus prevent undue wear of the brakes of the trailer.

Assuming now that the speed of travel of the draft vehicle is retarded: Immediately a backward thrust takes place, the piston 31 being attached to the cylinder 22, the plug 23 is forced backward or to the right, forcing the fluid behind or to the right of the piston 31 into the open end of the cylinder 22 and against the piston 27, the fluid in the chamber at the left of the piston 27 being drawn outwardly through the perforations 24 into the cylinder 25 in the space in front of or the left of the piston 31 thereof and the piston rod 28 being drawn forward or to the left in Fig. 8, thus causing an application of the brakes of the trailer.

In Fig. 3 is shown a slightly modified form of the invention, and in this figure the cylinder 25 is shown as secured to the draft vehicle A by the plug 23 of the cylinder 22, and is pivotally connected as at 50 to the draft vehicle. In this form of the invention the outer cylinder 25 is connected by means of a strap or the like 50′ to the draft bar 52 of the trailer, the strap 51 being preferably connected to the cap 29, closing the rear end of the cylinder 25. In this form of the invention the operation is the same as that described for the preferred form.

In addition to the braking operation heretofore described as taking place on the trailer, when the tractor slows up or stops the brakes are automatically applied on the trailer when the same is disconnected from the tractor. This is carried out in the following manner:

When the draw bar 10 is disconnected from the tractor it drops downwardly swinging about its pivotal point 10′. Inasmuch as the rigid rod 20 is attached to the draw bar 10, the same will be carried downwardly therewith. The draw bar 10 and the rigid rod swing about their respective pivots describing different arcs, and as the draw bar 10 moves downwardly the rigid rod 20 will be reciprocated in a rearward direction and move the plug 23 and the cylinder 22 to apply the brakes on the trailer. The rigid rod 20 supporting the weight of the draw bar 10, maintains the several parts in the above-described position and maintains the brakes in applied position until the draw bar 10 and the rigid rod 20 are again elevated to connect the trailer to the tractor.

From the foregoing it is apparent then that the present invention provides a new and improved brake-operating means for trailer vehicles, which not only applies the brakes automatically upon a reduction of speed of travel of the draft vehicle, but also permits of an operation of the trailer vehicle in a rearward direction without an application of the brakes.

What is claimed is:

1. In a device of the character described, a plurality of fluid-containing cylinders having telescopic engagement, fluid contained in each of said cylinders, a plurality of perforations formed on one of said cylinders whereby the fluid in one cylinder may be displaced into the other cylinder, and means for moving said cylinders relative to one another to cause displacement of the fluid from one cylinder to another.

2. A device of the character described comprising an inner cylinder and an outer cylinder arranged in spaced relation to each other, the outer cylinder having two closed ends and the inner cylinder having an open end, a rod passed through the inner cylinder, a packing secured to said rod and forming a piston for the inner cylinder, a packing carried by the inner cylinder and forming a piston for the outer cylinder, fluid carried within each of said cylinders, means whereby the fluid in each of said cylinders is displaced to the other cylinder upon movement of either of the cylinders relative to the other cylinder, and means for imparting movement to either of said cylinders.

3. In a device of the character described, a cylinder, a cap plate closing each end of said cylinder, a stuffing box carried by each cap plate, a second cylinder mounted interiorly of said first-mentioned cylinder and having sliding movement through one of said stuffing boxes, a packing carried by said second-mentioned cylinder, said packing forming a piston for the first-mentioned cylinder, a rod slidably mounted in the other stuffing box and into an open end of the second-mentioned cylinder, a packing carried by said rod and constituting a piston for said second-mentioned cylinder, a plurality of openings provided in said second-mentioned cylinder and forming communicating means between the cylinders, and an operating member connected to one end of said second mentioned cylinder.

MILTON WILLIAMS ARMSTRONG.